April 7, 1970     W. M. GREENSLATE     3,504,453

TROLLING AND CASTING FISH LURE

Filed May 29, 1968

Wesley M. Greenslate
INVENTOR.

United States Patent Office 3,504,453
Patented Apr. 7, 1970

3,504,453
TROLLING AND CASTING FISH LURE
Wesley M. Greenslate, P.O. Box 128,
Martell, Calif. 95654
Filed May 29, 1968, Ser. No. 733,148
Int. Cl. A01k 85/04
U.S. Cl. 43—42.5                4 Claims

ABSTRACT OF THE DISCLOSURE

A fishing lure is generally teardrop-shaped in plan and has a flat tapering body terminating at its forward end with a 90° twist and an eye for freely receiving a snap fastener. A concavo-convex recess is provided at a rearward portion of the body and the rear end is formed as a crescent-shaped flange.

---

This invention relates to a fishing lure which is expressly but not necessarily, designed and uniquely adapted to successfully catch salmon, steelheads, trout and the like and which achieves the desired action in that the blade does not turn over and over in a manner that, in the absence of an undesirable swivel, would twist the line.

Persons conversant with trolling spoons and spinning lures in the field of invention under consideration are aware that a hook is usually attached to the dished rearward or trailing end and that the leading or forward end is apertured in one manner or another for the attachment of a ring to which a line connecting swivel is joined as shown for example in Patent 1,464,041, issued to Henry I. Holcomb.

Briefly, the herein disclosed lure comprises an elongated spotted blade which is teardrop-shaped in plan and which, generally construed, is characterized by a forward end portion, a rearward end portion, a body portion, and a dished or indented concavo-convex bowl portion at the junctional point between the body and rearward end portion. The rearward end portion, which is flat-faced, defines a segmental or crescent-shaped flange which is commensurate with and projects beyond the rear curvate margin of the bowl or dimple and has a centered hole to which the properly bent eye of the fishhook is connected. The progressively narrowing body portion and forward end portion have flat top and bottom surfaces in a common plane and the leading end of the forward portion is formed with a 90° twist or neck which is fashioned into a flat-faced ring-like eye which in use assumes a normally vertical plane. The twist causes the perimeter of the hole in the eye to assume a horizontal plane. The cross-section or gauge or the rounded wire hook of the dual-hook snap-fastener is small compared to the diameter of the hole whereby to provide a loose linking and fulcruming connection which while secure prevents the attached line from becoming twisted and allows the novel lure to wobble from side to side as it swims through the water which is being fished.

Experimental use of the lure has shown that it attractively cradles and tips from side to side with the result that the directly attached fishhook wiggles in an animated manner. These alluring actions depend in part on the 90° twist and upstanding eye to which the rounded hook snap fastener is detachably linked in conjunction with the depressed concavo-convex bowl arranged inwardly or forwardly of the segmental lip-like flange to which the fishhook is centrally linked.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
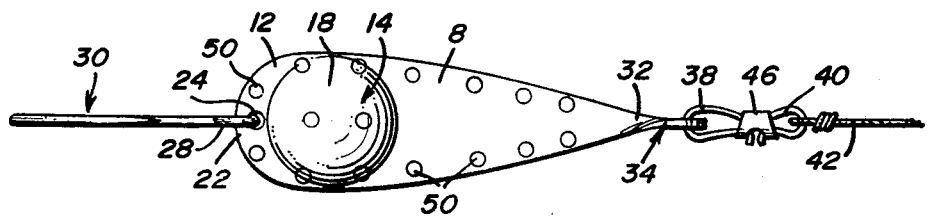

And FIG. 3 is a bottom plan view of the same.

The lure herein disclosed can be made in varying sizes and will be made of appropriate lightweight but durable sheet material. It is ordinarily of a length that fish will strike and still provide the animated action desired. In practice this lure will be painted in different colors. Experimental models have been made in brass, stainless steel polished on one side and painted on the other side. The thickness of the metal of the blade can be made to the gauge prescribed by the manufacturer for use for either casting or trolling as the case may be.

The teardrop-shaped lure or blade is denoted by the numeral 6. It is characterized by a main body portion 8, a forward end portion 10, a rearward end portion 12 and an intervening portion constituting a junctional portion and which is distinct in that it is provided with a concavo-convex indentation 14. The upwardly facing concave side of the indentation 16 provides a dimple or bowl while the depending convex side is denoted at 18. It will be noticed that the rearward or trailing end portion 12 actually projects in the form of a lip or flange beyond the rearward part 20 of the bowl. Accordingly and as shown perhaps best in FIGS. 2 and 3 this rearward end portion is cescent-shaped or segmental in plan. The curved marginal edge is denoted at 22 and the central portion is provided with a hole 24 to which the integral eye 28 of the fishhook 30 is connected. The plan configuration of the blade (either top or bottom) may be referred to as teardrop shape. Thus the body portion and forward end portion progressively taper toward a leading end which is provided with an approximately 90° twist as at 32 which merges with and joins an apertured terminal designated as an eye 34. When the lure is being pulled through the water in a normal horizontal plane the eye 34 assumes a substantially vertical position. The size and diameter of the hole in the eye 36 is significant in that the marginal edge can be said to be in a horizontal plane. This unique eye is at right angles to the plane of the flat-faced body and forward end portions 8 and 10 as is evident from the views of the drawing. Normally in a conventional-type blade the hole would be punched through a flat surface and not provided, as in the instant matter, with a twisted properly located line attaching eye.

The aforementioned double-ended or dual-type snap fastener is denoted by the numeral 36 and is made from bendable wire of requisite cross-sectional gauge. The rounded loop 38 at the left is passed through the hole 36. The rounded loop 40 at the right serves to permit the line 42 to be attached thereto. The terminal hooks 44 are engageable with suitable keepers provided on the clip 46. This type of a fastener facilitates attachment to the lure and also attachment of the line thereto. It takes the place of the swivel which is ordinarily but often objectionably used because it permits a lure to revolve throughout an orbital path in the water which is being fished.

Figure 1:
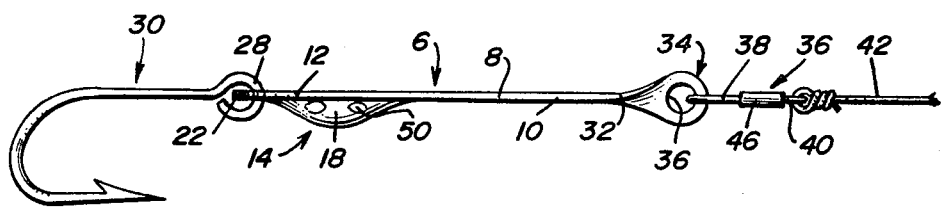
FIG. 1 is a view in side or edge elevation of a trolling and casting fish lure constructed in accordance with the invention and showing the same rigged for use in either casting or trolling as the case may be.

As will be noted in particular in FIG. 1 the diameter of the hole 36 is appreciably greater than the cross-sectional dimension of the wire loop or hook 38 which is loosely linked to the eye. This loose linking connection provides a relatively small bearing point or surface between the horizontal hole edge or perimeter and the fine gauge wire of the loop 38. It follows that the lure herein shown and described well serves the purposes for which it is intended when the component parts are assembled in the manner shown and described.

Figure 2:
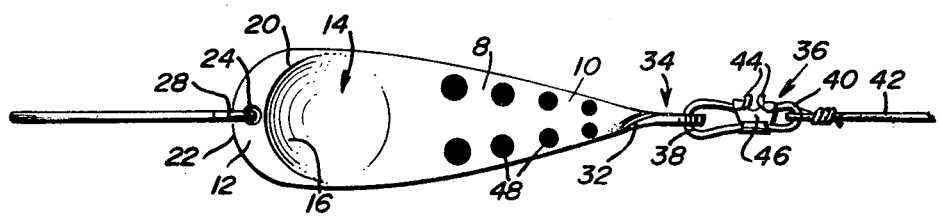
FIG. 2 is a top plan view of the structure disclosed in FIG. 1.

It can be added that the surfaces of the lure can be provided with spots 48 as shown in FIG. 2 or additional spots as shown on the bottom side at 50 more particularly in FIG. 3.

The manner in which the component parts are constructed and assembled is believed to be self-evident from the views of the drawing for which reason a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. A fishing lure comprising an elongated blade, said blade being teardrop-shaped in plan and embodying a forward end portion, a rearward end portion and an intervening body portion, said rearward end portion being substantially flat flange-like crescent-shaped in plan and having a semi-circular trailing edge, the major part of said body portion being flat and gradually decreasing in width toward and merging with said forward end portion, said forward end portion having a narrow leading end joining and provided with a laterally twisted terminal, said terminal being provided with a hole and defining a snap-fastener attaching eye, said eye being ring-like in side elevation and disposed in a plane at 90° to the plane of said blade, that portion of the over-all blade constituting the juncture between the body portion and rearward end being dished and providing a circular concavo-convex bowl, the rearward half-portion of said bowl being concentric with and spaced forwardly from said semi-circular trailing edge and, when acting in conjunction with the flange and the twisted eye, causing the lure to swim along and wobble from side to side without turning over and over, and, in combination, a line attaching snap-fastener having a first hook having a rounded bent portion passing loosely through said eye and adapted to fulcrum on a coacting marginal edge of said eye, and a second hook for attachment thereto of a coacting end of a fishing line.

2. The lure defined in and according to claim 1, and wherein a centralized portion of said crescent-shaped flange is provided with a hole, and a trailing-type fishhook embodying a rigid shank having an integral laterally offset eye passing through said hole and linking itself to said flange.

3. A fishing lure comprising an elongated blade having a body portion, a forward end portion, a rearward end portion and a dished concavo-convex bowl at the juncture of the body and rearward end portions, respectively, said bowl being circular in plan, said rearward end portion being segmental in plan, flat-faced, providing a flange, said flange projecting rearwardly from the rear half-portion of said bowl and having a fishhook with an eye pivotally joined to said flange, said body portion and forward end portion being flat and in a common plane, said forward end portion having a leading terminal portion twisted and apertured to define an eye, said eye being adapted to assume a vertical plane when the lure is being trolled along in a generally horizontal plane while rocking and wobbling from side to side.

4. The lure defined in and according to claim 3, and wherein said eye is ring-like and flat-faced, and, in combination, a double-end snap-fastener embodying resilient wire hooks and keeper means for retaining the hooks in closed positions, one hook having a rounded bight portion connected with a marginal edge portion of said eye and said eye being a cross-section appreciably less than the inside diameter of said eye, whereby to provide a loose but operatively linking connection between the snap-fastener and eye.

References Cited
UNITED STATES PATENTS

| 916,691 | 3/1909 | Fey | 43—42.5 |
|---|---|---|---|
| 2,043,001 | 6/1936 | Lambrecht | 43—42.5 |
| 2,554,216 | 5/1951 | Scott | 43—42.5 |
| 2,605,574 | 8/1952 | Rolf | 43—42.52 X |
| 3,359,676 | 12/1967 | Crossan | 43—42.5 X |

WARNER H. CAMP, Primary Examiner